March 17, 1964 T. S. KULKA 3,125,215

COMBINED HOUSING AND RETAINING MEANS FOR REELS OF TAPE

Filed June 21, 1962

INVENTOR

THOMAS S. KULKA

BY Elmon S. Nelson

ATTORNEY

United States Patent Office 3,125,215
Patented Mar. 17, 1964

3,125,215

COMBINED HOUSING AND RETAINING MEANS FOR REELS OF TAPE

Thomas S. Kulka, 200 Film Bldg., 2108 Payne Ave., Cleveland 14, Ohio

Filed June 21, 1962, Ser. No. 204,137
14 Claims. (Cl. 206—52)

This invention relates to the utilization and storage of tapes commonly employed in the magnetic recording of sound or for film used in motion pictures and more particularly to devices for housing or partially housing the reels upon which such tape is commonly wound and for simultaneously preventing unwinding of the tape from such reels.

This application is a continuation in part of my copending application Serial No. 767,866, filed October 17, 1958, now Patent No. 3,078,987, dated February 26, 1963, which in turn is a continuation in part of application Serial No. 494,771, filed March 16, 1955 and now Patent No. 2,867,318 dated January 6, 1959.

The use of tape coated with a magnetic substance for recording sound has increased to a remarkable extent over the past few years, and in order to prevent damage to the tape which is commonly stored on reels, it is imperative that some means be provided to house or partially house such reels and, at the same time, prevent inadvertent unwinding of the tape therefrom. This means should be relatively inexpensive and should be capable of application to the reel with a minimum of effort and at the same time, provide an effective means for holding the tape against unwinding and without damage to such tape or the reel upon which the same is wound. It is further desirable that means be provided for housing or partially housing the reel in order to protect the same and prevent an undesirable accumulation of dust or other foreign substance thereon and obviously, such housing means should occupy a minimum of space and it is also advantageous that means be provided to retain the reel in the housing to prevent inadvertent removal thereof from such housing.

Heretofore it has been common practice to prevent the unwinding of tape from a reel by merely placing an elastic band or the like about such tape on the reel and storing the reel, either in individual boxes or containers or storing a plurality of reels in a single container. It has also been proposed to utilize various types of clips or spring means which attach to the reel and in various ways engage the tape thereon to prevent inadvertent unwinding. Unfortunately, the use of many of these prior art devices for preventing inadvertent unwinding of the tape requires a considerable degree of manual dexterity in order to hold the reel, prevent the tape from unwinding and apply the device to the reel in such a manner as to properly engage the tape and, at the same time, prevent damage thereto by scratching or other damage caused by too great a pressure on the tape. Furthermore, many of these prior art devices were completely useless for preventing unwinding of tape from a reel when such tape only partially filled the reel leaving a relatively wide space between the outer circumference of the tape and the outer circumference of the flanges of the reel. Furthermore, few, if any, of these prior art devices provided any means for simultaneously housing or protecting the reels of tape or for retaining the reels therein and it was, therefore, necessary to apply the clip or other securing means to the reel and thereafter, insert the reel in whatever container was provided therefor. It appears obvious that a combined housing and tape retaining means which also retains the reel in the housing and in which it is only necessary to insert the reel in the housing and at the same time, engage the tape retaining means with the tape on such reel would be highly desirable and represent a very material step forward in the art.

It is accordingly an object of this invention to provide a combined housing and tape retaining means for tape holding reels which may be economically manufactured from readily available materials and in which the reel may be inserted therein by a simple manual operation in proper position for preventing unwinding of the tape and for retaining the reel in the housing.

A further object of the invention is the provision of a combined housing and tape retaining means for tape holding reels in which the housing may be constructed from cardboard or other suitable materials and which may provide a complete or partial housing for the reel and in which the tape retaining means combined therewith may consist of an elastic band of rubber or other suitable material positioned in a container in such a manner as to automatically slip between the flanges of the reel and engage the tape thereon when the reel is inserted in the housing.

A still further object of the invention is the provision of a combined housing and tape retaining means for tape holding reels in which the tape retaining means may be conveniently renewed in the event of breakage or damage thereto.

Another object of the invention is the provision of a combined housing and tape retaining means for tape holding reels in which the tape retaining means is fully operative to prevent inadvertent unwinding of the tape regardless of the length of such tape present on the reel.

A further object of the invention is the provision of a combined housing and tape retaining means for tape holding reels in which the tape retaining means operates to retain the reel in the housing and at the same time, prevent inadvertent unwinding of the tape thereon.

A still further object of the invention is the provision of a combined housing and tape retaining means for tape holding reels in which the tape retaining means may take the form of an elastic band provided with a member thereon having a thickness greater than the thickness or diameter of the band for engaging the tape on the reel and preventing entry of the band between the tape and the flanges of the reel.

Another object of the invention is the provision of a combined housing and tape retaining means for tape holding reels in which the tape retaining means may take the form of an elastic band provided by a coil spring.

A further object of the invention is the provision of a combined housing and tape retaining means for tape holding reels in which a single tape retaining means in the form of an endless elastic band of rubber or provided by a coil spring may be utilized to simultaneously engage two reels of tape to retain the same in the housing and at the same time, prevent inadvertent unwinding of the tape thereon.

A still further object of the invention is the provision of a combined housing and tape retaining means for tape holding reels in which the housing may comprise a generally rectangular box and in which the tape retaining means may be in the form of an elastic band of rubber or a coil spring extending diagonally across the box between opposite corners.

Another object of the invention is the provision of a combined housing and tape retaining means for tape holding reels in which the housing may comprise a generally rectangular box and in which the tape retaining means may be in the form of an elastic band of rubber or provided by a coil spring in which the ends of the band are attached to opposite sidewalls of the box and in which an intermediate point of the band is attached to another sidewall of the box to provide a V thereby providing a band having two legs which engage between the flanges of the reel and engage the tape thereon at two points.

Further objects and advantages of the invention will be apparent from the following description taken in conjunction with the accompanying drawing wherein:

FIG. 1 is a view in perspective showing a box for receiving two reels of tape and in which the tape retaining means comprises an endless elastic band twisted to form an X with one portion of the band crossing the other band at a different elevation, the lower band serving to engage one reel of tape and the upper band serving to engage a second reel of tape and with the band secured to opposite sidewalls of the box;

Figures 1, 2, 3, 4, 5, 6, 7:
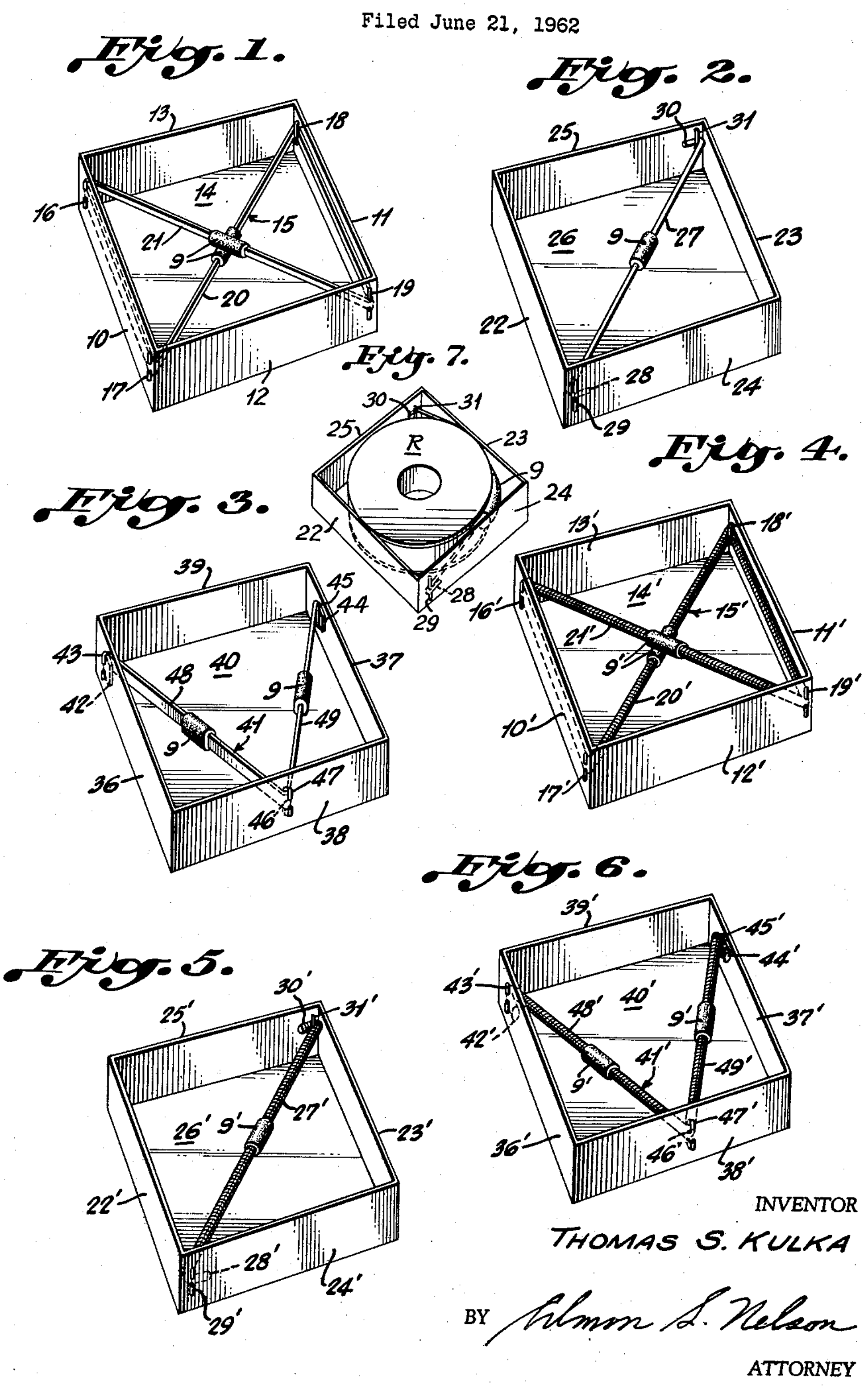
FIG. 2 is a view similar to FIG. 1, but showing a tape retaining means in the form of a band extending between diagonally opposite corners of the box and intended to engage a single reel of tape.
FIG. 3 is a view in perspective showing another form of housing and tape retaining means in which the housing is a box open at the top and in which the tape retaining means comprises an elastic band secured to the sidewalls and one end wall of the box to provide a V-shaped tape engaging band.
FIG. 4 is a view similar to FIG. 1, but showing the tape retaining band formed as a coil spring.
FIG. 5 is a view similar to FIG. 2, but showing the tape retaining band formed as a coil spring.
FIG. 6 is a view similar to FIG. 3, and showing the tape retaining band formed as a coil spring; and, FIG. 7 is a perspective view showing a reel R mounted in the reel housing and with the tape retaining means engaging the tape on the reel.

With continued reference to the drawing, there is shown, in FIG. 1, a combined housing and tape retaining means for two reels of tape and which may well comprise a generally rectangular box provided by sidewalls 10, 11, 12 and 13 and by a bottom wall 14. The box may be open at the top and may be closed by a separate cover or by a cover hinged thereto. An endless band 15 of elastic material is twisted to form a cross with portions of the band secured by staples or other suitable fastening means 16 and 17 at spaced points to the sidewall 10 and with the opposite portion of the band 15 secured by staples or other suitable fastening means 18 and 19 at spaced points to the sidewall 11 thereby providing a lower reel and tape engaging portion 20 extending between diagonally opposite corners and an upper reel and tape engaging portion 21 extending between the other diagonally opposite corners.

A tape engaging member 9 may be provided on the lower portion 20 and a similar tape engaging member 9 on the upper portion 21 and such tape engaging members may be of yieldable or other suitable material and may be in the form of sleeves received on the band, may be formed integral with the band or may be provided as inserts, or in other words, connected to spaced ends of the band. The tape engaging members 9 are of a greater diameter or thickness than the thickness or diameter of the band and, of course, the band 15 is of such diameter or thickness as to be received between the flanges of a reel upon which tape is wound and which is to be positioned in the housing provided by this invention.

In utilizing the form of the invention shown in FIG. 1, a reel of tape is first inserted in the box with the member 9 and lower band portion 20 received between the flanges of the reel and with the member 9 in engagement with the peripheral surface of the tape thereon, the reel being supported on the bottom wall 14 and being held in place by the band 20 and tape engaging member 9 disposed between the flanges of the reel and, of course, engagement of the member 9 with the peripheral surface of the tape will prevent unwinding thereof from the reel. Furthermore, the member 9 will prevent inadvertent entry of the band 20 between the edges of the tape and the inner surfaces of the flanges of the reel.

In a similar manner and after installation of the lower reel, the second reel may be inserted in the box with the tape engaging member 9 and band portion 21 received between the flanges of the upper reel with such reel supported on the lower and obviously, the tape engaging portion 9 and the upper band portion 21 will operate to retain the second reel in the box and will also prevent unwinding of the tape thereon.

With particular reference to FIG. 4, there is shown a modified form of the invention shown in FIG. 1 and described above and in FIG. 4 there is provided a generally rectangular box having sidewalls 10', 11', 12' and 13', as well as a bottom wall 14'. As before, the box is open at the top and may, if desired, be closed by a separate cover or by a cover hingedly mounted thereon.

An endless elastic band in the form of a coil spring 15' is twisted to form a cross and one portion of the band 15' is secured to the sidewall 10' intermediate the height thereof by staples or other suitable fastening means 16' and 17'. The opposite portion of the band 15' is secured to the sidewall 11' intermediate the height thereof by staples or other suitable fastening means 18' and 19'. The twisting of the band 15' to form a cross serves to provide a lower tape and reel engaging portion 20' and an upper tape and reel engaging portion 21'. Secured to the lower and upper tape and reel engaging portions 20' and 21' are tape engaging members 9' which are similar in construction and arrangement to the members 9 described above in connection with FIG. 1.

The form of the invention shown in FIG. 4 and described above is substantially the same as the form of the invention shown in FIG. 1, except the elastic band of FIG. 1 is replaced by a coil spring 15' in FIG. 4 and the operation of this form of the device shown in FIG. 4 is the same as that described above in connection with FIG. 1, and, therefore, repetition of the descriptive matter is not believed necessary or desirable.

In FIG. 2 there is shown another modified form of the invention in which there is provided a box comprising sidewalls 22, 23, 24 and 25 and a bottom wall 26. The box may be open at the top and may, if desired, be provided with a separate cover or may be closed by a cover hingedly mounted thereon.

Disposed within the box and extending substantially between diagonally opposite corners is a band 27 having a tape engaging member 9 associated therewith and one end 28 of the band may be conveniently secured to the wall 24 by a staple or other suitable fastening means 29 at a location adjacent that corner of the box. The opposite end 30 of the band 27 may be secured to the end wall 25 adjacent the opposite corner of the box by a staple or other suitable fastening means 31.

In use, a reel of tape may be disposed in the box on either side of the diagonally disposed band 27 and such band which is elastic with member 9 thereon will, of course be disposed between the flanges of the reel in engagement with the peripheral surface of the tape thereon to retain the reel in the box and prevent unwinding of the tape. The member 9 disclosed in FIG. 2 is the same as that shown in FIG. 1 and described above and no further description of such tape engaging member 9 is considered necessary or desirable.

With particular reference to FIG. 5, there is shown a slightly modified form of the invention shown in FIG. 2 and described above and in FIG. 5 there is shown a box comprising sidewalls 22', 23', 24' and 25' and a bottom wall 26' which serves to provide a box open at the top. As before, a separate cover may be provided or, if desired, a cover hingedly mounted on the box may be utilized to close the same. Disposed within the box and extending substantially between diagonally opposite corners is a band 27' formed as a coil spring and a tape engaging member 9' is provided on the spring 27'. One end 28' of the band 27' may be conveniently secured to the wall 24' by a staple or other suitable fastening means 29' at a location adjacent that corner of the box. The opposite end 30' of the coil spring 27' may be secured to the wall 25′ adjacent the opposite corner of the box by a staple or other suitable fastening means 31′.

The form of the invention shown in FIG. 5 differs from that shown in FIG. 2 by provision of the coil spring 27′ instead of the elastic band 27 and the use of the device shown in FIG. 5 is the same as that shown in FIG. 2 and no further description thereof is considered desirable or necessary.

A still further modified form of the invention is shown in FIG. 3 in which there is provided an open topped box comprising sidewalls 36, 37, 38 and 39 and a bottom wall 40. As before, the box may be closed by a separate cover or, if desired, a cover hingedly mounted thereon may be utilized.

Disposed within the box is an elastic band 41 with one end 42 thereof secured to the sidewall 36 by suitable means, such as a staple 43 and it is to be noted that the end 42 of the band 41 is located adjacent the sidewall 39. Similarly, the end 44 of the band 41 is secured to the sidewall 37 by suitable means, such as a staple 45 and once again the end 44 is located substantially opposite the end 42 and adjacent the sidewall 39. The mid-point 46 of the band 41 is secured to the sidewall 38 by suitable means, such as a staple 47 and this staple is located substantially midway of the length of the sidewall 38 to provide an elastic band of substantially V-shape having legs 48 and 49 extending at an angle to the sidewalls 36 and 37 of the box. The legs 48 and 49 of the elastic band 41 are provided with tape engaging members 9 which are of the same character as those described above in connection with the form of the invention shown in FIG. 1.

In use, a reel of tape is disposed in the box with the members 9 on legs 48 and 49 of the band 41 engaging the tape between the flanges of the reel and on opposite sides thereof to urge the reel into contact with the sidewall 39 of the box and thereby retain the reel in place and prevent inadvertent unwinding of the tape.

With particular reference to FIG. 6, there is shown a modified form of the invention shown in FIG. 3 and described above and in FIG. 6 there is shown a generally rectangular open topped box provided by sidewalls 36′, 37′, 38′ and 39′ and a bottom wall 40′. A separate cover may be utilized or, if desired, a cover hingedly mounted on the box may be used to close the same.

Disposed within the box is an elastic band formed of a coil spring 41′ and with one end 42′ thereof secured to the sidewall 36′ by suitable means, such as a staple 43′ and it is to be noted that the end 42′ of the band 41′ is located adjacent the end wall 39′. Similarly, the end 44′ of the band 41′ is secured to the sidewall 37′ by suitable means, such as a staple 45′ and once again the end 44′ is located substantially opposite the end 42′ and adjacent the end wall 39′. The midpoint 46′ of the band 41′ is secured to the sidewall 38′ by suitable means, such as a staple 47′ and this staple is located substantially midway of the length of the sidewall 38′ to provide a band of substantially V-shape having legs 48′ and 49′ extending at an angle to the sidewalls 36′ and 37′ of the box. As before, the legs 48′ and 49′ of the coil spring 41′ are provided with tape engaging members 9′.

The form of the invention shown in FIG. 6 is utilized in exactly the same manner as the form shown in FIG. 3 and described above and no further description or explanation of the use thereof is considered necessary or desirable.

There have been described several different forms of means for housing a reel of tape and for retaining the reel of tape in the housing and for preventing inadvertent unwinding of the tape thereon and it will be noted that each form of the invention operates to efficiently perform the desired function and may be provided in accordance with the personal preference of the user. All of the forms of the invention may be economically manufactured and provided at a minimum cost thereby permitting efficient and safe storage of reels of tape which will securely retain the tape wound thereon. It is also to be noted that all forms of the invention described above may be utilized without intricate manual operations and that, therefore, no difficulty should be experienced in utilizing the same.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A combined housing and retaining means for a reel and tape carried thereby, said reel having flanges with said tape disposed between said flanges and having an outer diameter less than the diameter of said flanges, said housing comprising two pairs of opposed substantially parallel sidewalls and a bottom wall providing a generally rectangular box, said retaining means comprising an elastic band extending above and across said bottom wall and secured to said housing and a tape engaging member on said band intermediate the length thereof, said band having a width or thickness less than the distance between said flanges and said member having a thickness greater than the width or thickness of said band, whereby a reel of tape may be disposed in said box with a flat side of said reel resting on said bottom wall with said band and member received between the flanges of said reel to retain said reel in said box, said member engaging the peripheral surface of said tape to prevent unwinding thereof and said member preventing entry of said band between the tape and the flange of said reel.

2. A combined housing and retaining means for a reel and tape carried thereby, said reel having flanges with said tape disposed between said flanges and having an outer diameter less than the diameter of said flanges, said housing comprising two pairs of opposed substantially parallel sidewalls and a bottom wall providing a generally rectangular box, said retaining means comprising an elastic band extending across and above said bottom wall and secured to said housing, said band having a width or thickness less than the distance between said flanges, whereby a reel of tape may be disposed in said box with a flat side of said reel resting on said bottom wall with said band received between the flanges of said reel to retain said reel in said box, said band engaging the peripheral surface of said tape to prevent unwinding thereof.

3. A combined housing and retaining means for a reel and tape carried thereby as defined in claim 1 in which said retaining means comprises an endless elastic band twisted to provide two opposed parallel portions secured to opposite sidewalls of said box and with upper and lower reel and tape engaging portions extending diagonally across said box from the four opposite corners and two tape engaging members on said band disposed centrally of said box one above the other, whereby one reel of tape may be disposed in said box in engagement with said bottom wall with the lower portion of said band and member received between the flanges of said reel and engaging the peripheral surface of the tape thereon and a second reel may be disposed in said box in engagement with said first reel with the upper portion of said band and member received between the flanges of said second reel and engaging the peripheral surface of the tape on said second reel.

4. A combined housing and retaining means for a reel and tape carried thereby as defined in claim 3 in which said elastic band is composed of a coil spring.

5. A combined housing and retaining means for a reel and tape carried thereby as defined in claim 2 in which said retaining means comprises an endless elastic band twisted to provide two opposed parallel portions secured to opposite side walls of said box and with upper and lower reel and tape engaging portions extending diagonally across said box from the four opposite corners, whereby one reel of tape may be disposed in said box in engagement with said bottom wall with the lower portion of said band received between the flanges of said reel and engaging the peripheral surface of the tape thereon and a second reel may be disposed in said box in engagement with said first reel with the upper portion of said band received between the flanges of said second reel and engaging the peripheral surface of the tape on said second reel.

6. A combined housing and retaining means for a reel and tape carried thereby as defined in claim 5 in which said elastic band is composed of a coil spring.

7. A combined housing and retaining means for a reel and tape carried thereby as defined in claim 1 in which said retaining means comprising an elastic band extending diagonally across said box from two opposite corners with the ends of said band secured to said sidewalls adjacent said corners.

8. A combined housing and retaining means for a reel and tape carried thereby as defined in claim 7 in which said elastic band is composed of a coil spring.

9. A combined housing and retaining means for a reel and tape carried thereby as defined in claim 2 in which said retaining means comprises an elastic band extending diagonally across said box from two opposite corners with the ends of said band secured to said sidewalls adjacent said corners.

10. A combined housing and retaining means for a reel and tape carried thereby as defined in claim 9 in which said elastic band is composed of a coil spring.

11. A combined housing and retaining means for a reel and tape carried thereby as defined in claim 1 in which said retaining means comprises an elastic band having the ends thereof secured to opposite sidewalls of said box and with an intermediate point of said band secured to another sidewall to provide a V and a tape engaging member on each leg of said band, whereby both legs and members may be received between the flanges of said reel with both members engaging the tape thereon.

12. A combined housing and tape retaining means for a reel and tape carried thereby as defined in claim 11 in which said elastic band is composed of a coil spring.

13. A combined housing and retaining means for a reel and tape carried thereby as defined in claim 2 in which said retaining means comprises an elastic band having the ends thereof secured to opposite sidewalls of said box and with an intermediate point of said band secured to another sidewall to provide a V, whereby both legs of said V may be received between the flanges of said reel in engagement with the tape thereon.

14. A combined housing and retaining means for a reel and tape carried thereby as defined in claim 13 in which said elastic band is composed of a coil spring.

References Cited in the file of this patent

UNITED STATES PATENTS

| | | |
|---|---|---|
| 500,955 | Rusk | July 4, 1893 |
| 1,483,592 | Pelstring | Feb. 12, 1924 |
| 1,797,539 | Arthur | Mar. 24, 1931 |
| 2,542,640 | Dixon | Feb. 20, 1951 |

FOREIGN PATENTS

| | | |
|---|---|---|
| 386,182 | Great Britain | Jan. 12, 1933 |
| 870,122 | France | Dec. 5, 1941 |